United States Patent [19]

Klein

[11] 4,018,946
[45] Apr. 19, 1977

[54] PRODUCTION OF HEAT-EXPANDABLE STYRENE-POLYMER BIT-PIECES
[75] Inventor: Max Klein, New Shrewsbury, N.J.
[73] Assignee: Sealed Air Corporation, Fair Lawn, N.J.
[22] Filed: Nov. 28, 1975
[21] Appl. No.: 636,103

Related U.S. Application Data

[63] Continuation-in-part of Ser. No. 106,915, Jan. 15, 1971, abandoned, which is a continuation-in-part of Ser. No. 889,332, Dec. 31, 1969, abandoned, which is a continuation-in-part of Ser. No. 515,445, Dec. 21, 1965, abandoned.

[52] U.S. Cl. .................................. 427/222; 427/242
[51] Int. Cl.$^2$ ..................... B05D 1/18; B05D 7/02
[58] Field of Search ............... 260/2.5 B; 428/407; 427/222, 242

[56] References Cited
UNITED STATES PATENTS

| | | | |
|---|---|---|---|
| 2,797,443 | 7/1957 | Carlson | 260/2.5 B |
| 2,894,918 | 7/1959 | Killoran et al. | 428/407 |
| 2,983,692 | 5/1961 | D'Alelio | 260/2.5 B |
| 2,993,022 | 7/1961 | Coler | 428/407 |
| 3,013,996 | 12/1961 | Pollard et al. | 260/2.5 B |
| 3,039,977 | 6/1962 | Ingram | 260/2.5 B |
| 3,056,752 | 10/1962 | Zweigle | 428/407 X |
| 3,056,752 | 10/1962 | Hall et al. | 260/2.5 B |
| 3,259,594 | 7/1966 | Wright | 260/2.5 B |
| 3,342,760 | 9/1967 | Rode | 260/2.5 B |
| 3,399,025 | 8/1968 | Nicholson | 260/2.5 B |

*Primary Examiner*—James R. Hoffman
*Attorney, Agent, or Firm*—Lerner, David, Littenberg & Samuel

[57] ABSTRACT

Methods for producing expandable discrete styrene-polymer bit-pieces impregnated with a liquid aliphatic impregnant which volatizes below said polymer's softening point are disclosed. Specifically, the disclosed methods include mixing a quantity of the styrene-polymer bit-pieces in an aqueous solution with a sufficient quantity of the aliphatic impregnant to provide the planned extent of impregnation and a quantity of a compatible water-soluble emulsifying agent sufficient to emulsify that quantity of impregnant in the aqueous solution. Furthermore, methods for producing such expandable discrete sytrene-polymer bit-pieces including mixing the bit-pieces with the required amount of aliphatic impregnant in a hermetically sealed impregnant chamber free of moving parts, and rotating the sealed impregnator at a speed sufficient to maintain the bit-pieces in agitation while heating the aqueous solution by indirect heat exchange are also disclosed.

In addition, the improved styrene-polymer bit-pieces produced by this method are also disclosed, having extended shelf lives, improved densities, and substantially uniformly-sized mixed pentagonal and hexagonal cells.

5 Claims, No Drawings

PRODUCTION OF HEAT-EXPANDABLE STYRENE-POLYMER BIT-PIECES

A CROSS-REFERENCE TO RELATED APPLICATIONS

This application is a continuation-in-part of co-pending application Ser. No. 106,915, filed Jan. 15, 1971, now abandoned, which in turn is a continuation-in-part of the then co-pending application Ser. No. 889,332 filed Dec. 31, 1969, now abandoned, which in turn is a continuation-in-part of the then co-pending application Ser. No. 515,445, filed Dec. 21, 1965, now abandoned.

FIELD OF THE INVENTION

The present invention relates to the production of expandable styrene-polymers by impregnating discrete styrenepolymer bit-pieces (such as pellets, beads, or grind) with an apliphatic liquid impregnant (e.g., hydrocarbon or chlorohydrocarbon). More particularly, the present invention relates to the production of expandable styrene-polymers by impregnating discrete styrene-polymer bit-pieces with an aliphatic liquid impregnant which is a non-solvent for the specific polymer and volatilizes at a temperature below its softening point, while immersing the bit-pieces in a liquid diffusion vehicle, such as a mixture of a minor portion of the impregnant in a major portion of water, and heating that mixture and bit-pieces.

BACKGROUND OF THE INVENTION

Attempts heretofore made in the commercial production of expandable pellets of styrene-polymers were fraught with serious disadvantages, limitations and costly operations. That was due to the need to avoid serious agglomeration of the polymer pellets during the impregnation operation and the difficulty of handling inert gases and feeding the liquid impregnant into a stirring autoclave and retaining its vapors and these gases against leakage.

The extensively long time required for feeding in the liquid impregnant and completing the impregnation very seriously limits production capacity with consequent increased cost. Moreover, that requires very special and costly stuffing-box construction and also highly expensive, relatively short-lived packings in the need to maintain pressure-tight operation around the stirrer shaft, result in further shortcomings, and increased production cost and capacity restriction.

The foregoing various difficulties, disavantages and shortcomings in the piror art are avoided by the process of the invention.

SUMMARY OF THE INVENTION

In accordance with the present invention, a method for producing expandable discrete styrene-polymer bit-pieces impreganted with a liquid aliphatic impregnant which volatilizes below the softening point of the polymer is provided, the aliphatic impregnant being a hydrocarbon and/or a halogenated hydrocarbon, (such as Freon) and the polymer being insoluble in the aliphatic impregnant, wherein a quantity of the styrene-polymer bit-pieces are mixed in an aqueous solution with a quantity of the aliphatic impregnant sufficient to provide the desired extent of impregnation and a quantity of a compatible water-soluble emulsifying agent sufficient to emulsify the quantity of aliphatic impregnant in the aqueous solution. Preferably, the quantity of the styrene-polymer bit-pieces to be impregnated, the quantity of the aliphatic impregnant sufficient to provide the planned extent of impregnation, and the quantity of the compatible water-soluble emulsifying agent sufficient to emulsify that quantity of aliphatic impregnant in the aqueous solution is such that the bit-pieces when expanded will have a desnity from about 0.03 to about 0.005 compared to water.

In accordance with another aspect of the present invention, a method for producing expandable discrete styrene-polymer bit-pieces impregnated with a liquid aliphatic impregnant which volatilizes below the softening point of the polymer is provided in which a quantity of the styrene-polymer bit-pieces to be impregnated, along with a quantity of the aliphatic impregnant sufficient to provide the planned extent of impregnation in an aqueous solution, is mixed in an impregnator, which is preferably cylindrically shaped, free of moving parts, and capable of being hermetically sealed. The impregnator is then hermetically sealed after being filled with the aqueous solution, and is then rotated around an axis of rotation intersecting and perpendicular to the central axis of the cylinder, and located at about the mid-point of the central axis. Rotation is conducted at a speed sufficient to maintain the polymer bit-pieces in agitation while heating the aqueous solution by indirect heat exchange to a temperature between at least about 104° F. and a temperature below the second order transition point of the polymer, until the planned extent of impregnation is obtained, and then separating the impregnated bit-pieces from the liquid phase. In a preferred embodiment, the respective separate quantities of the different ingredients in the aqueous solution are so selected as to their respective proportions to one another such that when all of them are charged into the impregnator, they substantially completely fill the impregnator.

In a preferred embodiment of the present invention, expandable styrene-polymer bit-pieces impregnated with a liquid aliphatic impregnant volatilizing below the softening point of the polymer are provided which, after storage at normal ambient storage conditions for at least about a year, show no significant loss of their original expansion capacity upon being heated to a sufficient expansion temperature above the softening point of the polymer. Furthermore, these bit-pieces upon being heated to such expansion temperature expand to have a density in that expanded form from about 0.03 to about 0.005 as compared to water, and furthermore a fine slice of these expanded bit-pieces present substantially throughout a honeycomb array of substantially uniformly-sized apparently mixed pentagonal and hexagonal cells, when prepared according to the method described above.

DETAILED DESCRIPTION

The present invention provides certain advantages, economics and enhanced production performance, and yields impregnated bit-pieces of the styrene-polymer in discrete free-flowing non-agglomerated form. The use of the emulsifier results in impregnated bit-pieces which have a long extended shelf life, and, upon being heated in near boiling to boiling water, expand to expanded styrene-polymer pieces having substnatially uniformly-sized cells distributed substantially uniformly throughout the entire individual pieces as further described below.

The use of the present impregnator vessel permits agitation of the polymer bit-pieces in a cylindrical closed impregnator vessel without having any agitating means passing through its wall. One advantage of this construction resides in the fact that the step of agitating the polymer bit-pieces can be effected by rotating the closed loaded impregnator vessel about a substantially horizontal axis normal to the middle of its central or longitudinal axis.

A further advantage of this invention resides in the fact that it is now possible to include a water-soluble redox (i.e. reduction-oxidation) mixture in the liquid diffusion vehicle. This apparently enhances or catalyzes the polymerization of any residual monomer in the polymer bit-pieces, helps to avoid agglomeration, and enhances their subsequent expansion.

In accordance with this invention, it is also possible to conduct the impregnation operation at a temperature even as high as the Vicat softening point of the polymer, and up to a point significantly below the so-called second order transition point, sometimes called the glass temperature, that is to say, sufficiently below it to avoid that change.

The Vicat softening point is the softening temperature of the polymer as determined by the method of Vicat (on which see German Industrial Standard Din-Blatt 57302, Beuth Vertrieb-G.m.b.H., Berlin W15). Thus, the Vicat softening point or temperature is that temperature at which a needle having at its lower end a cross-section of 1 square millimeter and held under a load of 5 kilograms sinks 1 millimeter into the polymer as its temperature is raised at the rate of 122° F per hour.

In another embodiment of the present invention, a very finely divided aluminum silicate mono-layer-coated with polymerized vinyl tris (2-methoxyethoxy) silane is employed, in a relatively small amount with respect to the emulsifying agent (in the charge), thus not only enhancing the agglomeration-free impregnation of styrene-polymer pellets, but also enabling such impregnation of styrene-polymer grind, and also enlarging the extent of impregnation of the polymer bit-pieces, and allowing the use of markedly less emulsifying agent.

In accordance with the method of this invention, distinct impregnated expandable polystyrene bit-pieces are produced, which upon expanding them, as by being heated by hot water, say, from about 203° F. to boiling, they are expanded (throughout the batch and from batch to batch) to a form which includes substantially only relatively uniform small sized internal cells throughout the individual expanded bit-pieces, and having significantly low density. The impregnated pellets also show extended shelf life and under microscopic examination of a fine slice through such individual expanded pellets display a honeycomb array of pentagonal and hexagonal appearing cells.

The term "bit-pieces" includes any of the discrete free-flowing forms of any of the styrene-polymers, such as the various sizes of granules made by cutting the extruded polymer into small lengths and usually called pellets, the beads of various sizes obtained from suspension polymerization or otherwise as moulding the finely divided particles obtained by disintegrating any of these different forms, the so-called "grind" including the coarsely ground moulded styrene-polymer or waste such moulded polymer (of various sizes, e.g. ⅛ inch thickness, ¼ inch width, and ⅜ inches in length), and any other small sized shapes of any of them.

The expression "styrene-polymer" embraces not only polystyrene itself, but also polymers of any polymerizable substituted styrenes in any of their available average molecular weight, as well as copolymers of styrene with one or more other compatible polymerizable substances, such as the nuclear-alkylated or -halogenated styrenes, e.g.—the ring-methyl-or -chlorine-substituted styrenes, or even alpha-methyl styrene, or with beta-unsaturated esters, ethers, amides, or nitriles of acrylic acid and their alpha-position -alkylated homologs, vinyl esters of aliphatic and aromatic carboxylic acids, N-vinyl compounds as N-vinylcarbazole, N-vinylimidazole or N-vinylpyrrolidone.

Such copolymers of styrene usually should contain at least about 50% of styrene by weight, or it may be the predominating component or at least equal in predominance to the other higher present part of any terpolymers. The copolymers of styrene include also any of the various impact polystyrenes containing a major part of sytrene and a minor part of a styrene-butadiene rubber (usually designated SBR, sometimes called Buna-S), for example, as provided by emulsion polymerization of about 75 parts of butadiene and about 25 parts of styrene.

Thus, styrene-polymers also include styrene alloys (i.e. pressure or melt mixtures) of polystyrene with other polymers. Included in styrene-polymers also are the ABS resins, for example, as prepared by using (by weight) acrylonitrile in the range of from about 20 to 30%, butadiene rubber ingredient at from about 10 to 15%, with the balance being styrene to provide a total of 100%. The ABS resin can be of the graft type G (that is with the mixture of the respective amounts of the monomers and butadiene being copolymerized) or of the alloy type B (i.e. for which the separately, for example, emulsion polymerized monomers in the selected proportions are physically mixed together at high temperatures as in a Banbury-type-mixer), and in either case extruded and pelletized.

The method of the invention is applicable to any of the generally available bit-pieces (e.g. pellet, bead, or grind) sizes of these styrene-polymers, such as those with a length or diameter of from about 0.1 to about 5 millimeters as well as those with a diameter up to about 10 millimeters or even more. For example, it is possible to impregnate without any change in operating conditions any of these bit-pieces or respective sizes from 40 mesh to at least ⅛inch diameter, or mixtures of such sizes.

As the impregnating liquid or impregnant there may be used any suitable saturated or unsaturated liquid aliphatic or cyclo-aliphatic hydrocarbon, or mixtures of any of them, whose boiling point is below the Vicat softening point of the specific styrene-polymer, for example, pentane, hexane, heptane, petroleum ether, cyclopentane, cyclohexane, cyclopentadiene, and compatible halogenated hydrocarbons, preferably chlorinated hydrocarbons, such as methylene chloride or dichloroethylene, so long as the impregnating character thereof remains available under the impregnating conditions.

The utility of the penetrant is enhanced by including in the charge from about 0.1 to at times as much as 8% and sometimes even about 10%, by weight of the penetrant of a compatible water-soluble emulsifying agent. Such emulsifying agent may be any of the neutral soaps or synthetic wetting or dispersing agents such as are used as emulsifying agents in emulsion polymerization of styrene or any monomers used in preparing a styrene-polymer. Among these applicable emulsifying agents are sodium or potassium salts of fatty acids, such as sodium myristate, sodium or potassium oleate, or an anionic wetting agent such as sodium dodecyl sulfate, or a cationic emulsifying agent such as a quaternary ammonium salt as cetyl dimenthyl benzyl ammonium chloride.

As part of the invention the anionic emulsifying agent 'Gafac RE 610', a phospate ester of an ethoxylated alkyl phenol and composed of about equal parts of the monoand di-ester and a maximum of up to 5% of non-ionic component (product of General Aniline & Film Corporation, New York, N.Y, U.S.A., according to their U.S. Pat. Nos. 3,004,056 and 3,004,057), was found to be advantageously effective by its contributing to obtaining freedom from agglomeration in the use of higher proportions of styrene-polymer in the charge. Even with such high proportion of polymer it allows enhanced or higher impregnation as the more extensive expansion of the resulting impregnated pellets of heating them in boiling water.

The redox (r.e. reduction-oxidation) mixture also is independently advantageous in the use of it, to the extent of as little as 0.001% to about 0.01% by weight of the styrene-polymer, also contributes to the freedom from agglomeration and enhances the impregnation of the pellets as noted by their impoved expansion to yield lower density in their expanded form.

The redox mixture can be any of those effective in the emulsion polymerization of styrene and of mixtures resulting in styrene-polymers. They thus include, but are not limited to, mixtures, advantageously stoichiometrically proportioned as to their respective oxidation and reduction capacity, of an inorganic oxidizing agent as a water-soluble alkali metal oxidizing agent such as an alkali metal persulfate as potassium with the respective reducing equivalent amount of an inorganic reducing agent as a water-soluble alkali metal reducing agent such as an alkali metal sulfite, e.g., sodium sulfite, or an alkali metal bisulfite, for example, sodium bisulfite; or an inorganic peroxide such as hydrogen peroxide as oxidizing agent with a water soluble reducing salt such as a ferrous salt as ferrous sulfate with a reducing equivalent amount of a bisulfite or a reducing sugar or reducing amine.

Applicable organic oxidizing agents used in emulsion polymerization redox systems are exemplified by the hydroperoxides as cumene hydroperoxide, with which ferrous sulfate can be used as reducing agent, and also diisopropylbenzene hydroperoxide. With any of these organic oxidizing agents, there also can be used any of the following organic alkylamines. For example, cumene hydroperoxide can be used in the weight ratio or 0.28 parts of it to 0.2 parts of either of tetramethylenepentamine, U-non-n-butyl-ethylenediamine, 1,3-bis-(2-aminoethylamino)- propane, or beta-hydroxyethyl-ethylenediamine, or to 0.26 parts of 1,3-bis-(2-aminopropylamino)-propane, or to 0.3 parts of ethylenediamine. The others may be used in similar proportions as in their use in emulsion polymerization.

Where iron may be dissolved in the water of the charge, as by introduction as the cation of a reducing agent or by its natural presence in the water itself, and if demineralized water or water treated to remove iron is not used, it is advantageous to include in the redox mixture about 20 to 25% (by weight) of a sequestering agent preferably inorganic such as sodium pyrophosphate or sodium hexametaphosphate, to serve to complex the ferrous iron and thereby to enhance the rate of impregnation.

The styrene-polymer impregnation charge can be stirred without having any moving part extending into the interior of the impregnator vessel from without. This may be done, for example, by using a cylindrical impregnator equipped to be gas-tightly closed at tone of its ends by bolting a closure head or locking a manhole cover in it, each with intermediate liquid, vapor and gas tight gasket, and with an annular jacket for heating and cooling liquid circulation around the vessel; with the inner ends of diametrically opposed separated parts of a shaft welded to the outer surface of the impregnator and projecting through its jacket to enable rotation about an axis normally transverse to its central axis at about the midpoint of the latter. The heat-control jacket has an equatorially-positioned baffle encircling the impregnator and dividing the annular space between its outer wall and the inner wall of the jacket into two separate circulation zones, and two diametrically opposed longitudinally running baffles, each in its respective location in a plane running through the axis of the cylinder and the axis of the rotation shaft, and extending from the outer wall of the reaction vessel to the inner wall of the jacket thereby to divide each of the first two circulation zones into halves and thus provide four quarters or quadrants. A central bore extends from the outer end of each part of the shaft through it to (but not through) the outer surface of the wall of the impregnator. At the inner end of each of these two central bores a separate one of four holes each separately extends from the bore into diametrically opposed corners of each quadrant adjacent the two parts of the shaft separately respectively communicate with the inner end of the bore in its adjacent inner end of its respective part of the shaft. Connected at the outer end of each part of the shaft is a separate rotary union, one running to an inlet liquid line, and the other to an outlet liquid line.

Thereby heating or cooling water can be fed from the inlet liquid line into and through the inlet bore in what may be called the inlet part of the shaft and then through the four holes in its inner end into the respectively corresponding four corners of the four guadrants and through them to the diametrically opposed corners of the four guadrants to exit through the corresponding four holes in the inner end of the so-called outlet part of the shaft to flow through its central bore to its rotary union and then away through the liquid outlet or exit line.

The axis of rotation normal to the cylinder's central axis at about its midpoint passes through the center of mass of the impregnator when both of its ends are constructed alike. When these ends differ from one another as by one being cupped hemispherically convex outwardly and the other being flat by having a closure head bolted to an annular outwardly extending flange, the ends may differ in weight somewhat.

In such case the midpoint of the central axis may be slightly nearer one end than to the center of mass. Then the axis of rotation better might be located to run through the center off mass (and yet normal to the central axis). The small displacement in such case is intended to be embraced by the statement that in this type of impregnator the axis of rotation is perpendicular to the central axis at a location "about its midpoint".

Such jacketed reactor thus mounted on both parts of its shaft provides agitation to the styrene-polymer bit-pieces in the gas-, vapor-, and liquid-tightly enclosed treatment charge merely by the action resulting from the rotation and thus avoids the need for moving part to extend into the interior of the reactor through any kind of stuffing-box construction.

The invention is illustrated by, but not restricted to, the following examples.

EXAMPLE 1

46 gallons (391 pounds) of water were charged into a cylindrical pressure impregnator (58 gallons capacity, with its longitudinal axis about three times its diameter) mounted for rotation about an axis diametrically normal to the middle of its longitudinal axis, as more fully described above. To the water there was added one pound of the 'Gafac RE 610' emulsifying agent; and a catalytic redox mixture of 25 grams of potassium persulfate and 10 grams of sodium bisulfite, with which mixture was included 10 grams of sodium pyrophosphate.

Into that aqueous mixture there was charged 100 pounds of general purpose moulding polystyrene pellets (3 millimeters size). More water was added to adjust the liquid level to leave sufficient room only for the addition of 7 pounds of pentane, so that upon adding it the vessel was full to capacity. The impregnator then was pressure-tightly sealed (to hold back these liquids, water-vapor, and pentane vapor) by tightly bolting on its flat top cap over an intermediate gasket resistant to those liquids and their vapors.

The impregnator then was rotated (thereby actively agitating the polystyrene pellets) and hot water was circulated through the impregnator jacket to bring the temperature of the contents to 195° F. (taking about 90 minutes). The heating was continued to keep the contents at that temperature for about 30 minutes. Then cooling water was circulated through the jacket to lower the temperature of the contents rapidly to about 100° F.

Rotation then was stopped, the impregnator opened and its contents discharged through a screen to let the water drain off, leaving behind the wholly free running, non-agglomerated pentane-impregnated pellets. These were rinsed lightly with tepid water to remove merely the water-soluble substances in the adhering suspending water, and then were air draft dried. A three gram sample of the thus dried impregnated pellets occupied about 4.5 millileters whereas 3 grams of them expanded by heating in boiling water for one minute, after draining off the water, occupied 100 millilieters, or an over 22-fold expansion at 212° F. in 1 minute.

EXAMPLES 2 and 3

Example 1 was repeated twice, each time with a charge of 100 pounds of the polystyrene pellets. In one case, the additional water was run in to adjust the liquid level to enable adding only 4.5 pounds of pentane and in the second case to add only 3 pounds of it. In each case after adding the pentane, the operation was continued through the drying of the impregnated pellets as in Example 1. In each of the two runs, the impregnated pellets discharged from the impregnator, after allowing the aqueous suspending liquid to drain off through a screen, also were free running and free of agglomeration. The dried pellets of each run showed similar volumetric expansion over boiling water.

EXAMPLES 4 and 5

The 100 pounds of polystyrene in each of the Examples 1 and 2 are replaced in each case by the same weight of pellets of the copolymer prepared from the co-polymerization of 10 parts of styrene and 10 parts of acrylonitrile, and in each case the respective amount of pentane is replaced by the corresponding weight of cyclopentane. Then in each case, the impregnation operation is carried out as described in Example 1 to provide respectively relatively similar results.

EXAMPLES 6 and 7

The 100 pounds of polystyrene in each of Examples 1 and 2 are replaced in each case by the same weight of pellets of the copolymer prepared from the co-polymerization of 95 parts of styrene and 5 parts of n-butyl acrylate. Then in each case the impregnation operation was carried out as described in Example 1, with respectively relatively similar results.

EXAMPLE 8

The 100 pounds of polystyrene pellets of Example 1 are replaced by the same weight of pellets of a copolymer of 95 parts of styrene and 5 parts of alphamethylstyrene; and the impregnation procedure was carried out as described in Example 1 with relatively similar results.

Example 9

Example 1 was repeated in full as to all of its steps except that in place of its quantities of ingredients charged, there were used 40 gallons of water initially, and to it was added 2 pounds of the Gafac RE 610, the redox mixture composed of 50 grams of potassium persulfate, 50 grams of sodium bisulfite, and 50 grams of sodium pyrophosphate. Then there were admixed 150 pounds of the same polystyrene pellets (whose Vicat softening point was 192° F.) and more water added to leave room for then adding 10.5 pounds of pentane to fill the impregnator to its capacity. Otherwise, the procedure was just the same as in Example 1, with relatively similar results.

It was found that the water-soluble redox mixture can be replaced by a styrene-polymerization free-radical type catalyst such as alpha, alpha-azobisisobutyronitrile. At least one pound was, and more often, about 2 pounds or more, of the emulsifying agent Gafac RE 610 were, need per 100 pounds of polystyrene pellets to obtain some suitable impregnation when no possible enhancing agent was used with it.

It was found that by using the finely divided, substantially anhydrous aluminum silicate at least mono-layer-coated with the polymer resulting from the substantially complete moisture-hydrolysis of vinyl tris (2-methoxyethoxy) silane, the amount of the Garfac RE 610 needed can be reduced readily to 0.36 gram of it and even still much less per 100 pounds of the styrene-polymer pellets and also that agglomeration was consistently avoided not only in impregnating these pellets but especially also that free flowing, non-agglomerated impregnated styrene-polymer grind was attained.

The just earlier above-referred to anhydrous aluminum silicate mono-layer coated with the polymer resulting from the hydrolysis of this vinyl tris (2-methoxyethoxy) silane hydrolysis-polymer mono-layer-coated aluminum silicate.

The embodiments of the invention referred to in the three just preceding paragraphs are illustrated by, but not restricted to, the following examples:

EXAMPLE 10

800 pounds of moulded polystyrene grind (averaging about ⅛ inch thick, ¼ inch wide and ⅜ inches long) were charged into a cylindrical pressure impregnator (of about 637 gallons capacity, and longitudinal axis about three times its diameter) mounted for rotation as described in Example 1. Water was added to fill it to about 600 gallons. 6.5 pounds of Gafac RE 610 (a thick syrup) were added, and followed by 8.25 pounds of the vinyl tris (methoxyethoxy) silane hydrolysate-polymer mono-layer-coated aluminum silicate. Then 160 grams of alpha, alpha-azobisisobutyronitrile were added, followed by 64 pounds of pentane and a solution of 6.5 pounds of tris (2,3-dibromoprophy) phosphate in 6.5 pounds of methanol. Water then was added to fill the vessel to capacity.

The impregnator was sealed as described in Example 1 and, as therein and earlier above-described rotated at 6 r.p.m. about its shaft perpendicular to its longitudinal axis while water was circulated through its jacket to raise the contents temperature of 171° F. in about 3 hours. The heating was continued to hold the contents at that temperature for 35 minutes, when cooling water then was circulated through the jacket to cool the reactor content to below 100° F. Rotation was stopped and the impregnator contents discharged and rinsed as in Example 1. The product was free flowing, entirely without agglomeration, fire retarded, expandable polystyrene grind.

The solution of the fire retardant tris (2,3-dibromopropyl) phosphate in methanol used in Example 10 can be omitted and the example repeated without that solution to yield the same non-agglomerated expandable polystyrene grind without fire retardants.

Example 10 repeated using general purpose moulding polystyrene pellets yields them as impregnated pellets with a satiny-glossy surface. Other styrene-polymer pellets and grind can replace the grind or pellets used in Example 10 and the just mentioned repeat of it with pellets with correspondingly similar results.

The following illustrative, but not to be restricting, example demonstrates that the vinyl tris (2-methoxyethoxy) silane hydrolysis-polymer mono-layer-coated aluminum silicate enhances the provision of agglomeration-free impregnation of styrene-polymer bit-pieces in a charge including a different type of emulsifying agent.

EXAMPLE 11

A 10 fluid ounce content pressure bottle was charged with 75 grams of polystyrene pellets, 9 milliliters of pentane, 0.1 gram of alpha, alpha'-azobisisobutyronitrile, and 1 gram of the vinyl tris (2-methoxyethoxy) silane hydrolysis-polymer mono-layer-coated aluminum silicate. A 0.75% poly-vinyl alcohol aqueous solution then was added to the extent to leave only 5 milliliters of free space.

The bottle then was mounted on a carrier that enables it to be rotated at 36 r.p.m. about an axis normal to its longitudinal axis at about its midpoint and while immersed in a water-bath. The temperature was raised over 2 hours to 174° F. and held there for another 2 hours, after which the temperature was reduced to enable opening the bottle, screening and rinsing its contents. The product was entirely free-flowing and non-agglomerated expandable polystyrene pellets similar to those of Example 1, but being comparatively opaque and having a satiny-glossy surface.

The pellets of any of the styrene-polymers used in any of the examples can be replaced by the same or other quantitites of any of the other such styrene-polymers earlier above described as applicable in the various aspects and embodiments of the broader scope of the method of the invention. Similarly, the Gafac RE 610 emulsifying agent, while separately independently advantageous as stated earlier above, likewise can be replaced by a suitable sufficient amount of any other of the broadly described effective emulsifying agents, whether anionic, cationic, or nonionic, and compatible with the other materials in the specific charge, and can be used jointly with the vinyl tris (2-methoxyethoxy) silane hydrolysis-polymer momo-layer-coated aluminum silicate.

This latter silane hydrolysis-polymer momo-layer-coated aluminum silicate should be used in an amount at least sufficient to provide freedom from agglomeration under the operating condition used with the particular styrene-polymer bit-pieces and batch content. Ordinarily, so far as presently known it is beneficial to use it to the extent of at least about one-half percent of the weight of the styrene-polymer bit-pieces in the charge, although it may be sufficinetly effective below that depending on the material and the conditions; and one percent of the weight of the bit-pieces charge is quite generally effective with no indicated need to exceed about 2 percent of that charge weight although any such excess is innocuous.

Any of the individual members of the redox mixture of the examples can be replaced by an equivalent or effective different quantity of some other oxidizing, reducing or sequestering agent respectively, and whether inorganic or organic, so long as the components of the mixture are compatible with one another and the other chemical agents included in the water. Then too, if no iron is present in the charge, whether as part of an added agent or in the water used, it is possible to omit the sequestering agent member of the redox mixture.

Likewise, the pentane used in the various examples can be replaced by other amounts of it, or by the same or other amounts of any of the other herein specifically named or broadly described impregnants, depending on the needed impregnation extent. For example, it is possible to use from about 3 to about 7 or sometimes 8, and with the use of the vinyl tris (2-methoxyethoxy) silane hydrolysis-polymer mono-layer-coated aluminum silicate up to about 15, or possibly more, parts of any of them per 100 parts of polystyrene or other styrene-polymer bit-pieces. It has been found that by using over 7 parts of impregnant per 100 pounds of pellets significant increase in expansion of the bit-pieces such as pellets or grind, and decrease in the bulk density of the expanded form is obtained when over 7 and up to 15 parts of the impregnant is used per 100 parts of pellets.

As already stated, the ratio of water to polymer pellets should be at least sufficient to enable adequate agitation of the pellets under the operating conditions. It is beneficial to use 260 parts of water per 150 parts of polymer pellets, or also 300 or 400 parts of water to 100 parts of pellets. However, it can be impractical to increase the ratio of the water too far. Thus, a reasonably practical range can be from one to 10 parts of water per part of pellets, by weight.

As to operation, ordinarily there is nothing critical as to order of charging the constituents into the impregnator. It appears to be advantageous as to easier and earlier avoidance of agglomeration to charge the water and emulsifying agent before adding the other constituents. It also appears still more advantageous even to disslove the emulsifying agent in sufficient water to do that, before admixing that agent with water charge. However, it appears to be desirable to avoid mixing the vinyl tris (2-methoxyethoxy) silane hydrolysis polymer mono-layer-coated aluminum silicate with the emulsification agent such as the Gafac RE 610 before the rotation of the impregnator starts to mix the charge.

The time for bringing the impregnation charge to impregnation temperature may be less than the 90 minutes used in Example 1 for that time may be as short as the impregnator heating facilities and/or medium allow. So also, the time at the impregnation temperature may even be less than the 30 minutes used in that example.

So also, the impregnation temperature can be higher than the 195° F. of Example 1, for similarly charged runs were made at 200° F. without ill effect. That tempetature can be raised to 212° F. and even higher as to 250 or 275° F. so long as it is under the second order transition point of the specific styrene-polymer pellets used, and the impregnator can withstand the corresponding pressure with correspondingly shorter impregnation time.

While the impregnator charge after impregnation was cooled to 100° F., it need not be taken that low, for 120° F. also is low enough. Then too, this cooling stage can be omitted when the particular styrene-polymer pellets used show no tendency to agglomerate in the particular impregnation charge at the impregnation temperature.

The advantage in the type of agitation provided by that used in Example 1 is shown by the fact that in that example and others based on it, the rotation rate was as low as 3 revolutions per minute, and in Example 10 was only 6 r.p.m. The rotation need not be restricted to that for it can be 7 r.p.m. or even 10 or more, depending on the overall conditions, without adverse effect and even with improved operating results.

The advantage of the use of a redox mixture is independent of the form of agitation. That is so also as to the use of the impregnator filled to capacity. Thus, either or both of these two conditions can be used to advantage not only in the impregnator of Example 1 operated at a temperature below the Vicat softening point and preferably about 104° F., but also in any other impregnator with other means for providing agitation.

Then too, the particular means for providing agitation by use of the impregnator as described in Example 1, as amplified by the description preceding it, provides its own specific advantage.

Thus, Example 1, or any of the modifications of it by the other examples, can be considered as repeated without the use of either or both of (i) the mixture and (ii) the filling of the impregnator to substantially complete capacity, and even at a temperature from above 104° F., as by exemplifying the application of that particular means for providing agitation.

The vinyl tris (2-methoxyethoxy) silane hydrolysis-polymer mono-layer-coated anhydrous aluminum silicate is prepared, for example by tumbling very finely divided (e.g. average particle size about 0.0008 mm with say 70–75% being under 0.002 mm) anhydrous (or calcined) aluminum silicate particles in an amount of vinyl tris (2-methoxyethoxy) silane sufficient to provide at least a mono-layer-coating and substantially without exceeding a mono-layer-coating. Such amount can be determined by first starting the tumbling with an insufficient amount of the (liquid) starting silane.

After the liquid silane appears to have been taken up by the quantity of the finely divided aluminum silicate, vigorously shake 50 grams of it in 100 milliliters of water. If a significant amount of the particles sink after the shaking is stopped, they are not sufficiently coated. Then add a little more of the liquid silane to the batch of particles being coated, and repeat the test; and if a significant amount of particles still sinks, continue the tumbling with again a little more of the liquid silane, and again make the test; adding still more silane, continuing the tumbling and the test till no more, or only a very insignificantly disregardable bit, of the coated particles sinks to the bottom of the water.

That then shows that the particles in the tumbler are mono-layer-coated. The still free running particles then are spread in a thin layer and exposed to moist air or a mild stream of steam sufficient to hydrolyze the readily hydrolyzable methoxyethoxy groups linked to the silica of the starting substituted silane monomer, to convert the mono-layer-coating to a coating of the hydrolysis-polymer of the starting silane.

The thus finished hydrolysis-polymer mono-layer-coated anhydrous aluminum silicate (white in color) may contain 51 to 52.4% of silica, 42.1 to 44.3% of alumina, 1.56 to 2.5% of titanium dioxide, possibly a trace of iron oxide, and possibly 0.5% of moisture, and have a specific gravity of about 2.63. Its average particle size is about 0.81 microns, with from about 70 to 75% being less than 2 microns, and residue remaining on a 325 mesh screen (U.S. standard) being 0.009%; and it is hydrophobic.

While the invention was explained by giving complete description of certain specific embodiments of it, it is understood that various modifications and substitutions may be made in any of them within the scope of the appended claims which are intended also to cover equivalents of the specific embodiments

What is claimed is:

1. A method of producing expandable discrete styrene-polymer bit-pieces impregnated with a liquid aliphatic impregnant, which aliphatic impregnant volatilizes below said polymer's softening point, said aliphatic impregant being selected from the group consisting of hydrocarbons, halogenated hydrocarbons and mixtures thereof, said polymer being insoluble in said aliphatic impregnant, said method comprising mixing a quantity of said styrene-polymer bit-pieces to be impregnated with a quantity of said aliphatic impregnant sufficient to provide the planned extend of impregnation in an aqueous solution, in an impregnator chamber which is free of moving parts, hermetically sealing said impregnator after filling it with said aqueous solution, rotating said sealed impregnator around an axis of rotation intersecting and perpendicular to the central axis of cylinder at a speed sufficient to maintain said polymer bit-pieces in agitation while heating the aqueous solution by indirect heat exchange to a temperature between at least about 104°F. and below the second order transition point of said polymer, until the planned extent of impregnation is reached, and separating the impregnated bit-pieces from the liquid phase.

2. The method of claim 1, including adding to said aqueous solution a quantity of a compatible water-soluble emulsifying agent sufficient to emulsify said quantity of a compatible water-soluble emulsifying agent sufficient to emulsify said quantity of aliphatic impregnant in said aqueous solution.

3. The method of claim 1, wherein said impregnator is rotated at from about 3 to about 10 revolutions per minute.

4. The method of claim 1, including cooling said aqueous solution during continued rotation of said cylinder until the temperature is low enough to avoid agglomeration of said bit-pieces.

5. The mehod of claim 1, wherein the respective separate quantities of the different ingredients in the aqueous solution are so selected as to their respective proportions to one another such that when all of them are charged into the impregnator they substantially completely fill said impregnator.

* * * * *

UNITED STATES PATENT OFFICE
CERTIFICATE OF CORRECTION

Patent No. 4,018,946     Dated April 19, 1977

Inventor(s)  Max Klein

It is certified that error appears in the above-identified patent and that said Letters Patent are hereby corrected as shown below:

Column 5, Line 22, after "impregnation" and before "as" insert:  -- seen in -- .

Column 5, Line 25, omit "r.e." and insert therefor: -- i.e. -- .

Column 5, Line 39, after "potassium" and before "with" insert:  -- persulfate -- .

Column 5, Line 58, omit "U-non" and insert therefor: -- N-mono -- .

Column 6, Line 10, omit "tone" and insert therefor: -- one -- .

Column 7, Line 7, after "for" insert -- any -- .

Column 11, Line 64, after the second use of the word "the" and before "mixture" insert:  -- redox -- .

Column 12, line 65, after "of" insert -- said --.

Signed and Sealed this thirtieth Day of August 1977

[SEAL]

Attest:

RUTH C. MASON
Attesting Officer

C. MARSHALL DANN
Commissioner of Patents and Trademarks